United States Patent [19]

Staedeli

[11] 4,266,647
[45] May 12, 1981

[54] AUTOMATICALLY ENGAGEABLE JAW CLUTCH OR THE LIKE

[75] Inventor: Otto Staedeli, Menzingen, Switzerland

[73] Assignee: Maag Gear-Wheel & Machine Co. Ltd., Zürich, Switzerland

[21] Appl. No.: 11,776

[22] Filed: Feb. 12, 1979

[30] Foreign Application Priority Data

Feb. 23, 1978 [CH] Switzerland .................... 1961/78

[51] Int. Cl.³ .................... F16D 11/00; F16D 23/02
[52] U.S. Cl. .................................................. 192/67 A
[58] Field of Search ................ 192/67 R, 67 A; 64/23

[56] References Cited

U.S. PATENT DOCUMENTS

| 3,154,181 | 10/1964 | Sigg | 192/67 |
|---|---|---|---|
| 3,197,001 | 7/1965 | Clements | 192/67 A |
| 3,433,338 | 3/1969 | Clements | 192/67 A |
| 3,563,354 | 2/1971 | Sigg | 192/35 |
| 4,084,673 | 4/1978 | Clements | 192/67 A |

FOREIGN PATENT DOCUMENTS

1181992 11/1964 Fed. Rep. of Germany.
1959184 10/1972 Fed. Rep. of Germany.

Primary Examiner—Rodney H. Bonck
Attorney, Agent, or Firm—Werner W. Kleeman

[57] ABSTRACT

An automatically engageable jaw clutch having a toothed drive hub, a toothed power take-off hub, and a clutch star which is axially displaceable in relation to the power take-off hub. The power take-off hub is mounted to be rotatable and inclinable with radial play at a bearing body rigidly connected with the drive hub. This radial play is smaller than the radial play between a screw socket, operatively connected with the power take-off hub, and the clutch star. The clutch star has a first tooth system and a second tooth system. The clutch star, in axial spacing from its first tooth system, has a guide surface which is essentially concentric with respect to its axis of rotation. In the disengaged condition of the jaw clutch this guide surface is centered at a corresponding guide surface of one of both hubs, yet in the engaged condition of the jaw clutch such guide surface is spaced from the aforementioned corresponding guide surface.

7 Claims, 4 Drawing Figures

AUTOMATICALLY ENGAGEABLE JAW CLUTCH OR THE LIKE

BACKGROUND OF THE INVENTION

The present invention relates to a new and improved construction of an automatically engageable jaw clutch or gear coupling.

The automatically engageable jaw clutch of the invention is of the type comprising a toothed drive hub, a toothed power take-off hub, and a clutch or coupling star axially displaceable with respect to the drive hub. This clutch star can be continuously connected with the drive hub for conjoint rotation therewith by means of first teeth means formed thereat and has second teeth means which can be brought into engagement with the teeth of the power take-off hub by axially shifting the clutch star. Furthermore, there is provided a screw socket or sleeve which is connected by a pair of coarse-pitch threading with the power take-off hub, has radial play in relation to the clutch star, can be entrained by the clutch star in its direction of rotation by means of a pawl blocking device composed of pawls and a pawl gear-tooth system or ratchet wheel, and during its thread-in movement which is caused by the rotation of the screw socket the latter entrains the clutch star in axial direction.

Heretofore known jaw clutches of this type, for instance as disclosed in German Patent No. 1,959,184 and the corresponding U.S. Pat. No. 3,563,354 and German Patent No. 1,181,992, and the corresponding U.S. Pat. No. 3,154,181 are capable of being articulated to a certain degree in the engaged and disengaged states, in order to be able to compensate alignment errors of the shafts which are coupled with one another. These prior art jaw clutches cannot however be loaded by any appreciable transverse forces. Therefore, it is necessary that both of the shafts which are to be coupled with one another possess bearings or supports which are statically determined in other words, that such shafts each be supported at two respective locations. Due to this requirement the shaft strands between a drive machine and a driven machine, for instance between a gas turbine and a generator, which are to be coupled to one another by means of a jaw clutch of the type mentioned, are relatively long in any case when there is to be expected larger offsetting of the axes of the gas turbine shaft and the generator shaft, and this is especially so because the gas turbine shaft must be connected by a clutch which is flexible in two planes and a therewith merging intermediate shaft with the jaw clutch of the species under discussion.

SUMMARY OF THE INVENTION

Therefore, with the foregoing in mind it is a primary object of the present invention to provide a new and improved construction of automatically engageable jaw clutch which is not associated with the aforementioned drawbacks and limitations of the prior art proposals.

Another and more specific object of the present invention aims at the provision of a new and improved jaw clutch of the previously mentioned type which is designed such that, without impairing its functional reliability, it is capable both in the engaged and disengaged condition of transmitting transverse forces between the shafts which are to be connected with one another, and thus, can replace a stationary bearing or support.

Now in order to implement these and still further objects of the invention, which will become more readily apparent as the description proceeds, the jaw clutch of the present development is manifested by the features that the power take-off hub is rotatably and inclinably mounted with radial play at a bearing or support body rigidly connected with the drive hub. This radial play is smaller than the radial play between the screw socket and the clutch star. The clutch star possesses in axial spacing from its first teeth means a guide surface which is concentric with respect to its axis of rotation. This guide surface, in the disengaged condition of the jaw clutch, is centered at a corresponding guide surface of one of both hubs and in the engaged state of the jaw clutch is however separated therefrom.

By virtue of the fact that the radial play of the power take-off shaft, in relation to the bearing body which is rigidly connected with the drive hub, is smaller than the radial play between the screw socket and the clutch star, there is insured that the screw socket is not loaded by transverse forces. The screw socket and related pawls are sensitive components which, under all circumstances, must be easy in action, so that there can be always realized a disturbance free engagement and disengagement of the jaw clutch. The required hinge action of the jaw clutch in its engaged condition, renders it necessary that the continuously engaging teeth or teeth means of the drive hub and the clutch star are tiltable relative to one another over relatively wide limits. This tiltability is not desired in the disengaged state of the jaw clutch, since the clutch star in one such position would be mounted inexactly, something which could lead to vibrations and binding. In the disengaged state the clutch star is additionally centered due to its guide surface and the associated guide surface at one of both hubs, so that the axis of rotation of the clutch star coincides with the axis of rotation of one of both hubs. This additional centering action is eliminated during the engagement of the inventive jaw clutch, so that the clutch star does not hinder the required hinge action of the jaw clutch.

With a preferred exemplary embodiment of the invention the bearing body is arranged in a space-saving fashion within the power take-off hub. It is advantageous if there is arranged a substantially ring-shaped or annular bearing shell between the bearing body and the power take-off hub.

The first teeth means of the clutch star, which continuously mesh with the teeth means of the drive hub, preferably is in the form of a standard curved or spiral-tooth system having crowned teeth.

In order to retain as small as possible the axial structural length of the jaw clutch of the invention, the center of the first teeth means, in the engaged condition of the jaw clutch, preferably is located at the central plane of the bearing or support shell. In this way there is obtained at the same time the advantageous result that independent of the fact whether the jaw clutch of the invention is engaged or disengaged, there is always formed at the same location a pivot joint or hinge between both shafts which are to be coupled with one another.

According to a particularly preferred further embodiment of the invention, the guide surface coacting with the guide surface of the clutch star is preferably formed at the drive hub. Consequently, the clutch star, in the disengaged state, always remains coaxial with respect to the drive hub. The continuous meshing engagement of the teeth of the drive hub and the clutch star therefore, in the disengaged state, do not carry out any relative movement and thus do not become worn, even in the presence of pronounced axial alignment errors of the shafts which are to be coupled with one another.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
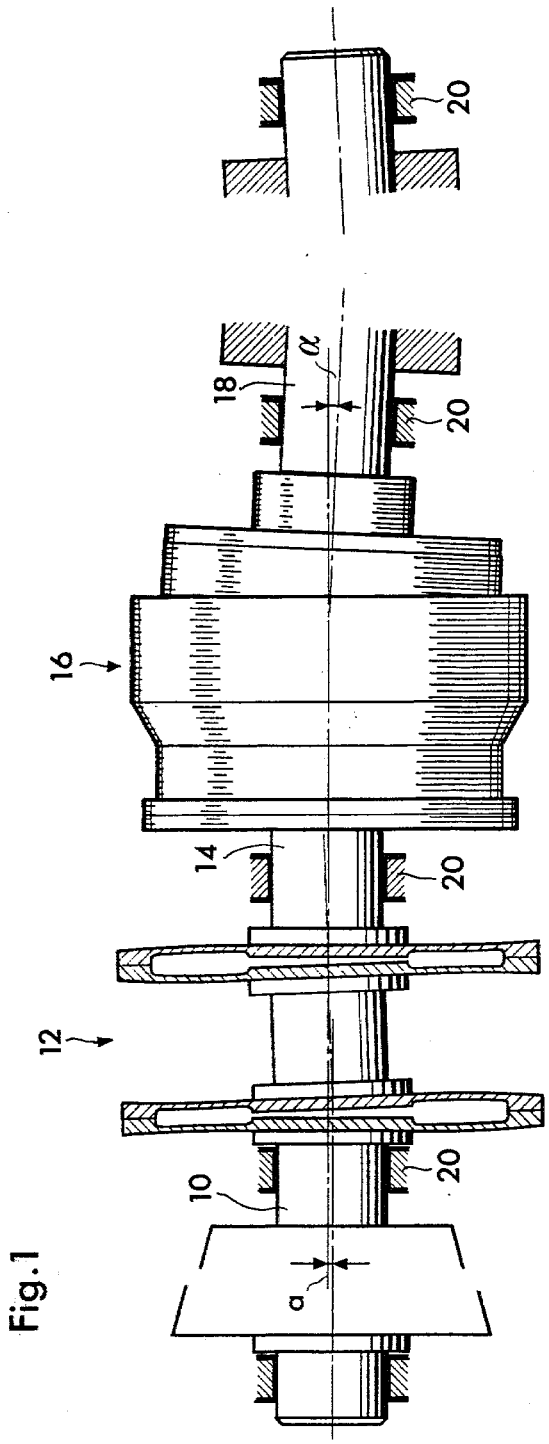
FIG. 1 illustrates a shaft strand, partially in axial sectional view, equipped with a jaw clutch according to the invention and shown in the engaged condition or state.

Describing now the drawings, in the showing of FIG. 1 a gas turbine shaft 10 is connected with a generator shaft 18 by means of a clutch or coupling 12 which is flexible in two planes, an intermediate shaft 14 and an automatically engageable jaw clutch 16. The shafts 10 and 18 are each mounted in two respective bearings or supports 20 which are fixed in position. The intermediate shaft 14, on the other hand, is only mounted in a single positionally fixed bearing 20, something which is possible by virtue of the type of jaw clutch 16 contemplated by the invention and described in greater detail in conjunction with FIGS. 2, 3 and 4.

Figure 2:
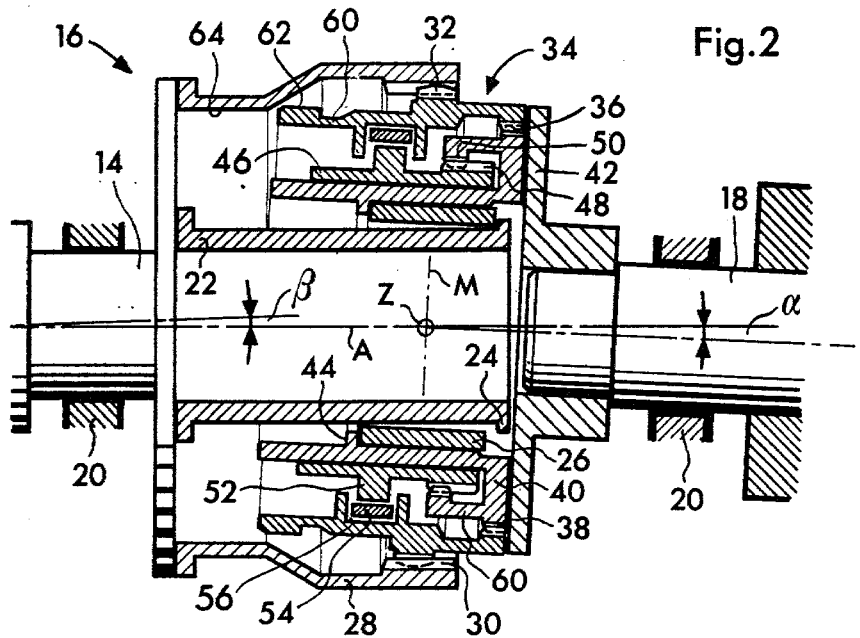
FIG. 2 is an enlarged axial section of the jaw clutch shown in FIG. 1, likewise showing the same in its engaged state.
Figure 3:
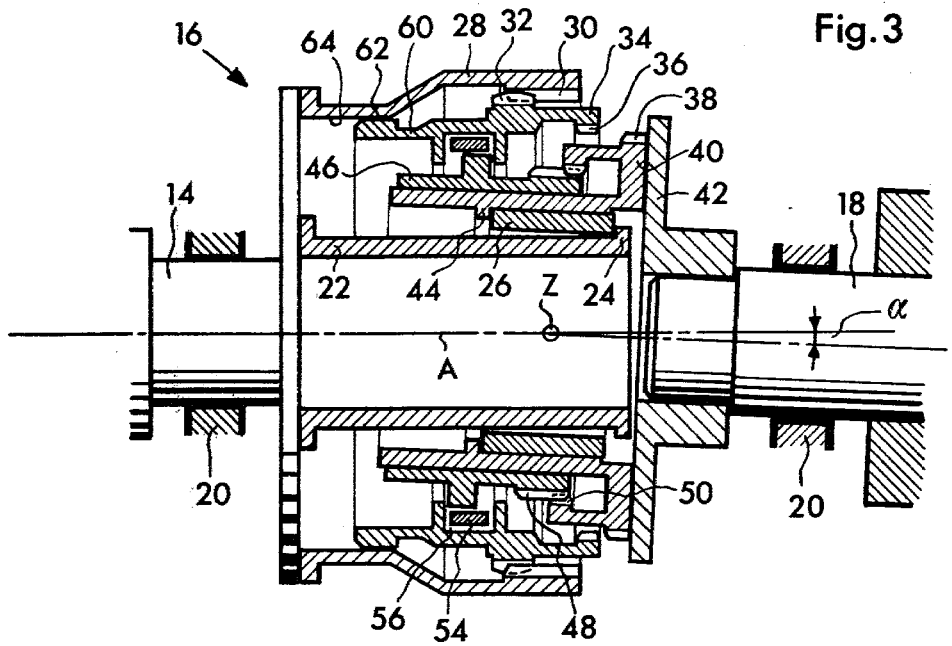
FIG. 3 is an axial sectional view of the jaw clutch of FIG. 1, shown in its disengaged state.
Figure 4:
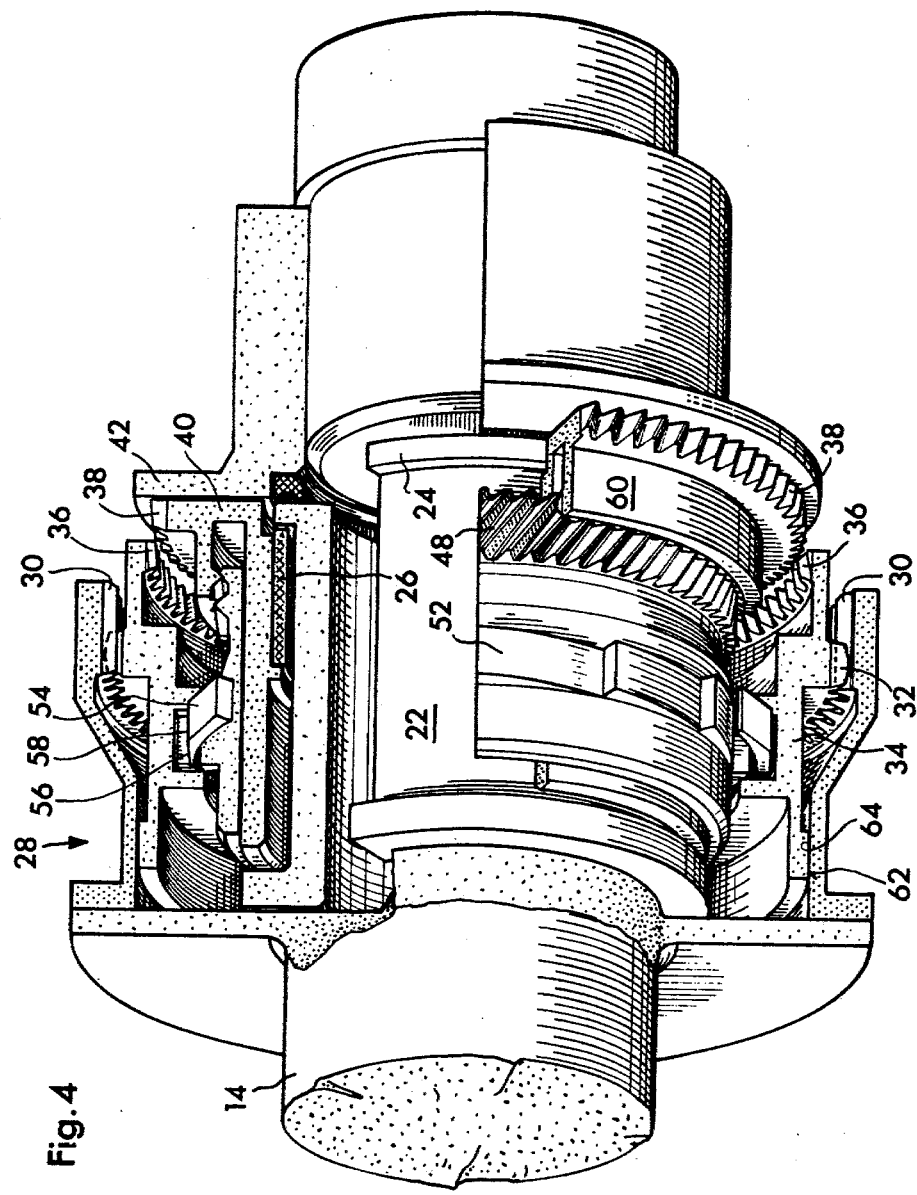
FIG. 4 is an enlarged perspective view of the jaw clutch of the invention, partially shown in cutaway view, and illustrating such jaw clutch in its disengaged state.

The jaw clutch 16 of the invention embodies an inner, substantially tubular-shaped bearing or support body 22 which is coaxially secured at the intermediate shaft 14 and terminates at a collar 24, as shown in each of FIGS. 2, 3 and 4. The bearing or support shell 26, operatively associated with radial play with the bearing body 22, is fixedly incorporated into a power take-off hub 40.

Furthermore, there is coaxially secured to the intermediate shaft 14 a drive hub 28 which encloses with radial play the bearing body 22. The drive hub 28 is provided at its right-hand end shown in the drawings, removed from the intermediate shaft 14, with internal straight teeth 30 which continuously mesh with a first tooth system or teeth 32 provided at the outside of a clutch or coupling star 34. The first teeth means 32 are arcuateshaped and crowned teeth. The clutch star 34 possesses at its inner surface a second tooth system or teeth means 36 which can be brought into engagement, by axially shifting or displacing the clutch star 34, with a set of complementary teeth 38 provided at the outside of the power take-off hub 40. The teeth or teeth means 36 and 38, in the illustrated embodiment, constitute helical teeth. The helical motion, i.e., the thread-in motion, by means of which these teeth 36 and 38 can be brought into engagement with one another, is limited by a flange 42 at which there is secured the power take-off hub 40. The flange 42 is attached, in turn, at the generator shaft 18.

The power take-off hub 40 encloses the bearing shell 26 without any appreciable radial play and limits its axial play by means of an inner collar 44. Thus, the intermediate shaft 14 is connected by means of the bearing body 22, the bearing shell 26, the power take-off hub 40 and the flange 42 with the generator shaft 18 in such a manner that both of these shafts, while mutually supporting one another, can nonetheless have an alignment error which, in FIGS. 1 to 3, has been illustrated by the angle α in a markedly exaggerated fashion. The intermediate shaft 14 also can have an alignment error in relation to the gas turbine shaft 10, which has been generally indicated in FIG. 2 by the angle β and the axle misalignment a likewise has been illustrated in extremely exaggerated fashion.

There is mounted within the clutch star 34 upon the hollow, toothed power take-off hub 40 a screw socket or sleeve 46 in such a manner that it is rotatable in relation to the power take-off hub 40 as well as in relation to the clutch star 34, however can only be axially displaced conjointly with the clutch star 34 in relation to the power take-off hub 40. This screw socket 46 is provided at its outside or outer surface with coarse-pitch threading 48 which is continuously threadably engaged with coarse-pitch threading 50 provided at the inside or inner surface of a tubular-shaped projection of the power take-off hub 40. The pitch of the coarse-pitch threading or thread means 48 and 50 corresponds in direction with the pitch of the helical teeth 36 and 38, but however is smaller in magnitude, i.e., the lead angle of the coarse-pitch threading 48 and 50, which also can be referred to as helical teeth, is greater than the lead angle of the teeth 36 and 38. Thus, the lead angle of the coarse-pitch threading 48 and 50 can amount to, for instance, 40° and the lead angle of the teeth 36 and 38, related to the associated reference diameter, can amount to for instance 25°. The teeth 36 and 38 are preferably provided at their ends which initially come into contact or engagement with one another during the clutching action with a bevel, the pitch of which corresponds to that of the coarsepitch threading 48 and 50.

At the outside or outer surface of the screw socket 46 there is formed a pawl tooth system or ratchet 52 with which there is operatively associated a set of pawls 54. The pawls 54, as particularly well seen by referring to FIG. 4, are mounted in a respective radially inwardly open recess 56 of the clutch star 34 and each have a tilt or pivot edge 58, by means of which they are pivotably supported at the clutch star 34.

The clutch star 34 has an essentially cylindrical projection 60 which is directed away from the flange 42. At the end of this projection 60 there is formed a cylindrical or slightly crowned outer guide surface 62 which is provided with a beveled portion. The axial spacing of the guide surface 62 from the crowned teeth 32 of the clutch star 34 preferably amounts to 20% to 50%, in the illustrated embodiment to about 30%, of the outer diameter of the teeth or teeth means 32. The outer guide surface 62 is operatively associated with a substantially cylindrical inner guide surface 64 which, in the embodiment under discussion, is arranged at the drive hub 28 in such a manner that both guide surfaces 62 and 64, as best seen by referring to FIG. 2, can mutually form a sliding seat fit, without losing the mutual engagement of both of the teeth 30 and 32. The diameter of the guide surface 64 is smaller than the inner diameter of the straight teeth 30, so that the assembly of the drive hub 28 with the clutch star 34 is possible without any difficulties.

With disengaged jaw clutch 16 the clutch star 34 is fixedly retained in the drive hub 28, due to the coaction of its arcuate-shaped or curved teeth 32 with the straight teeth 30 as well as due to the coaction of its guide surface 62 with the guide surface 64, in a manner such that both the clutch star 34 and the drive hub 28 are not only rigidly connected for rotation with one another, but also interconnected such that they are resistent to bending, in other words flexurally stiff. Hence, the clutch star 34 can thus neither rotate in relation to the drive hub 28, about the axis of rotation A which is common when the jaw clutch is disengaged, nor can tilt about an axis perpendicular to such axis A. On the other hand, in such disengaged state of the jaw clutch 16 there are possible movements of the power take-off shaft 40 together with the bearing shell 26 and the screw socket 46 in relation to the drive shaft 28 together with the clutch star 34, within limits which are fixed by the radial play between the bearing body 22 and the bearing shell 26. Thus, if the intermediate shaft 14 is inclined by the angle α in relation to the generator shaft 18, then this angle α also appears as an inclination angle between the clutch star 34 and the power take-off hub 40.

The jaw clutch 16 remains in its disengaged state for such length of time as the intermediate shaft 14 is at standstill during forward rotation of the generator shaft 18 or rotates slower than the generator shaft. As soon as the intermediate shaft 14 begins to rotate quicker than the generator shaft 18, then the pawls 54, by means of the pawl gear-tooth system or ratchet teeth 52, entrains the screw socket 46 in the direction of rotation and threads-in such, starting from the position shown in FIG. 3, to a greater extent into the power take-off hub 40. Consequently, the screw socket 46 entrains the clutch star 34 in axial direction, in other words in the showing of the drawings towards the right, so that the internal teeth 36 of the clutch star 34 come into engagement with the external teeth 38 of the power take-off hub 40, and finally press the right-hand end surface of the clutch star 34 against the flange 42. Due to the torque or rotational moment which is thus transmitted by means of the helical teeth 36 and 38, there is produced an axial force which presses the clutch star 34 against the flange 42. As a result there no longer can appear an angular deviation between the clutch star 34 and the power take-off hub 40, and both these elements, when the jaw clutch 16 has completely engaged, are not only rigidly connected for rotation with one another, but also so as to be flexurally stiff. Accordingly, the jaw clutch 16 allows the intermediate shaft 14 to be further positioned at an inclination, by the angle α, in relation to the generator shaft 18. This is rendered possible by virtue of the fact that, upon engagement of the jaw clutch 16, during the meshing of the teeth 36 and 38 of the clutch star 34 and the power take-off hub 40, the guide surfaces 62 and 64 come out of engagement with one another due to the axial shifting of the clutch star 34, so that the clutch star 34 now, in relation to the drive hub 28, can tilt about the center Z of its crowned teeth 32. During engagement of the jaw clutch 16 the clutch star 34 thus has imparted to it an additional degree of freedom of movement in relation to the drive hub 28, whereas it loses its freedom of mobility in relation to the power take-off hub 40.

The bearing shell 26 is fixed in axial direction by the outer collar 24 of the bearing body 22 and by the inner collar 44 of the power take-off hub 40 in such a manner that its central plane M, with the jaw clutch 16 engaged, contains the center Z of the arcuate-shaped or curved teeth 32.

Both of the shafts 14 and 18 which are interconnected by the inventive jaw clutch or gear coupling 16, are thus, on the one hand, mounted at one another by the jaw clutch 16 in its engaged as well as in its disengaged state, so that these shafts can only carry out very narrowly limited radial movements with respect to one another, but, on the other hand, are not hindered with regard to their angular mobility in relation to one another by the jaw clutch 16.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. An automatically engageable jaw clutch comprising:
    a toothed drive hub;
    a toothed power take-off hub;
    a clutch star axially displaceable with respect to the power take-off hub;
    a first gear tooth system provided at the clutch star for continuously connecting for conjoint rotation the clutch star with the drive hub;
    a second gear tooth system provided for said clutch star which can be brought into engagement with the teeth of the power take-off hub by axial displacement of the clutch star;
    a screw socket;
    a pair of coarse-pitch thread means for connecting the screw socket with the power take-off hub;
    said screw socket having radial play in relation to the clutch star;
    a pawl blocking device composed of pawls and a pawl gear-tooth system;
    said screw socket being rotatably entrainable by said clutch star in its direction of rotation through the action of said pawl blocking device;
    the thus engaged screw socket carrying out a thread-in movement which entrains the clutch star in axial direction;
    a bearing body rigidly connected with the drive hub;
    said power take-off hub being mounted with radial play to be rotatable and inclinable at said bearing body;
    said radial play being less than the radial play between the screw socket and the clutch star;
    said clutch star being provided at an axial spacing from its first gear tooth system with a guide surface which is essentially concentric with respect to the axis of rotation of said clutch star;
    one of said two hubs being provided with a guide surface; and
    said guide surface of the clutch star, in the disengaged state of the jaw clutch, being centered at said guide surface of said one hub and in the engaged state being spaced from said guide surface of said one hub.

2. The jaw clutch as defined in claim 1, wherein:

said bearing body is arranged within said power take-off hub.

3. The jaw clutch as defined in claim 2, further including:
a substantially ring-shaped bearing shell arranged between the bearing body and the power take-off hub.

4. The jaw clutch as defined in claim 1, wherein:
said first gear tooth system provided at the clutch star comprises a tooth system having crowned teeth.

5. The jaw clutch as defined in claim 3, wherein:
said first gear tooth system comprises a tooth system having crowned teeth;
said first gear tooth system having a center which, in the engaged state of the jaw clutch, is located essentially at a central plane of the bearing shell.

6. The jaw clutch as defined in claim 1, wherein:
the guide surface provided at one of both hubs is provided at the drive hub.

7. An automatically engageable jaw clutch comprising:
a toothed drive hub;
a toothed power take-off hub;
a clutch star axially displaceable with respect to the power take-off hub;
a first gear tooth system provided at the clutch star for continuously connecting for conjoint rotation the clutch star with the drive hub;
a second gear tooth system provided for said clutch star which can be brought into engagement with the teeth of the power take-off hub by axial displacement of the clutch star;
a screw socket containing means for connecting the screw socket with the power take-off hub;
said screw socket having radial play in relation to the clutch star;
a blocking device;
said screw socket being rotatably entrainable by said clutch star in its direction of rotation through the action of said blocking device;
a bearing body rigidly connected with the drive hub;
said power take-off hub being mounted with radial play to be rotatable and inclinable at said bearing body;
said radial play being less than the radial play between the screw socket and the clutch star;
said clutch star being provided at an axial spacing from its first gear tooth system with a first guide surface which is essentially concentric with respect to the axis of rotation of said clutch star;
one of said two hubs being provided with a second guide surface; and
said first guide surface of the clutch star, in the disengaged state of the jaw clutch, cooperating with said second guide surface of said one hub and in the engaged state of the jaw clutch being spaced from said second guide surface of said one hub.

* * * * *